(12) United States Patent
Higuchi

(10) Patent No.: US 6,983,140 B2
(45) Date of Patent: Jan. 3, 2006

(54) PORTABLE MOBILE UNIT

(75) Inventor: Kazutoshi Higuchi, Oomiya (JP)

(73) Assignee: Hitachi, Ltd., Tokyo (JP)

(*) Notice: Subject to any disclaimer, the term of this patent is extended or adjusted under 35 U.S.C. 154(b) by 571 days.

(21) Appl. No.: 09/842,913

(22) Filed: Apr. 27, 2001

(65) Prior Publication Data
US 2002/0045445 A1 Apr. 18, 2002

(30) Foreign Application Priority Data
Oct. 17, 2000 (JP) .............................. 2000-321918

(51) Int. Cl.
H04M 11/00 (2006.01)

(52) U.S. Cl. ...................... 455/421; 455/425; 455/524; 455/525; 455/550.1; 455/67.11; 455/522; 455/69

(58) Field of Classification Search ................ 455/522, 455/517, 69, 550.1, 67.11, 67.13, 67.16, 423, 455/566–567, 421, 524–525, 425, 127
See application file for complete search history.

(56) References Cited

U.S. PATENT DOCUMENTS

| 5,373,548 | A | * | 12/1994 | McCarthy .................... 455/462 |
| 5,603,088 | A | * | 2/1997 | Gorday et al. ............ 455/67.13 |
| 5,805,666 | A | * | 9/1998 | Ishizuka et al. ............ 379/1.01 |
| 5,809,414 | A | * | 9/1998 | Coverdale et al. .......... 455/421 |
| 6,018,655 | A | | 1/2000 | Bartle et al. |
| 6,144,858 | A | * | 11/2000 | Masuda .................... 455/456.3 |
| 6,151,493 | A | * | 11/2000 | Sasakura et al. ............ 455/421 |
| 6,175,744 | B1 | | 1/2001 | Esmailzadeh et al. |
| 6,188,890 | B1 | * | 2/2001 | Chang ........................ 455/421 |
| 6,198,934 | B1 | * | 3/2001 | Ohtsuki .................... 455/456.2 |
| 6,243,568 | B1 | * | 6/2001 | Detlef et al. ............. 455/226.4 |
| 6,330,437 | B1 | * | 12/2001 | Bozzetto et al. ............ 455/421 |
| 6,349,206 | B1 | * | 2/2002 | Reichelt et al. ............. 455/421 |
| 6,351,221 | B1 | * | 2/2002 | Phillips et al. ......... 340/825.49 |
| 6,385,183 | B1 | * | 5/2002 | Takeo ........................ 370/335 |
| 6,735,432 | B1 | * | 5/2004 | Jarett et al. ................. 455/417 |

FOREIGN PATENT DOCUMENTS

| JP | 08-149566 | 6/1996 |
| JP | 08-298884 | 11/1996 |
| JP | 08-335904 | 12/1996 |
| JP | 10-200957 | 7/1998 |
| JP | 11-074835 | 3/1999 |
| JP | 2000-224104 | 8/2000 |

* cited by examiner

Primary Examiner—William Trost
Assistant Examiner—Sharad Rampuria
(74) Attorney, Agent, or Firm—McDermott Will & Emery LLP

(57) ABSTRACT

A cellular phone capable of informing a user of the deterioration of a line speech quality by raising an alarm. In the cellular phone according to the present invention, the condition in which the saturation of a transmission output lasts for a predetermined period of time or longer is detected, and a deterioration in the uplink speech quality is thereby predicted, an alarm signal being sent out to the cellular phone. Thus, the user is notified that a deterioration in the uplink speech quality occurs.

5 Claims, 6 Drawing Sheets

PORTABLE MOBILE UNIT

BACKGROUND OF THE INVENTION

1. Technical Field of the Invention

This invention relates to a portable mobile unit, and more particularly to a portable mobile unit suitably used to give an alarm when an uplink signal does not reach a base station even though a downlink signal can be received normally at the mobile unit.

2. Description of Related Art

In related art, a cellular phone is contrived to give an alarm (making a warning sound) when the electric wave reception condition gets too weak to keep a communication while the cellular phone is in service. This alarm is an alarm alerting deterioration of the downlink speech quality, which is raised when a stable reception and demodulation of signals is deemed to be difficult based on an electric field intensity of the received wave or an error rate of a received signal in case of a digital system.

Japanese Patent Laid-Open No. 335904/1996 discloses a portable mobile unit for detecting an abnormality-representing signal when the level of the signal transmission power increases to a predetermined reference level or more due to a fault of the portable mobile unit continues for a period of time not shorter than a predetermined reference period of time, and then raise an alarm.

In the related art an alarm concerning the communication condition of a cellular phone is a downlink speech quality deterioration alarm, however no consideration was given at all to an alarm concerning the uplink speech quality.

A portable mobile unit disclosed in Japanese Patent Laid-Open No. 335894/1996 is for detecting the abnormality ascribed to a fault of the portable mobile unit, and cannot deal with the deterioration of the line speech quality.

SUMMARY OF THE INVENTION

The object of the present invention is to provide a portable mobile unit which is very convenient for a user by giving an alarm when the uplink speech quality lowers even though a downlink signal is normal. The portable mobile unit in the present invention is capable of immediately notifying its user that a signal sent out from the mobile unit does not reach a base station.

According to an aspect of the present invention, the portable mobile unit has a capability of making bi-directional wireless communication, and includes a controller for controlling the intensity of a transmission signal on the basis of a control signal contained in a received signal, a control operation being carried out so as to at least either display abnormality or give an alarm when an intensity control signal contains a command to set a transmission signal to a maximum transmission output with an intensity of a received signal within a predetermined range.

According to the present invention, when setting a transmission signal to a maximum transmission output is demanded though the receiving of a signal is being done normally, there is a possibility that the transmission signal does not reach the other party through a base station. In such a case, at least either an indication of abnormality is made or an alarm is given. Therefore, a user can immediately know that a signal sent out from his/her portable mobile unit does not reach the other party.

According to the present invention, a portable mobile unit which is very convenient for the user by enabling to immediately inform a user of the deterioration of the uplink speech quality, can be obtained.

BRIEF DESCRIPTION OF THE DRAWINGS

Preferred embodiments of the present invention will be described in detail on the basis of the following figures, wherein.

DESCRIPTION OF THE PREFERRED EMBODIMENTS

Figure 1:
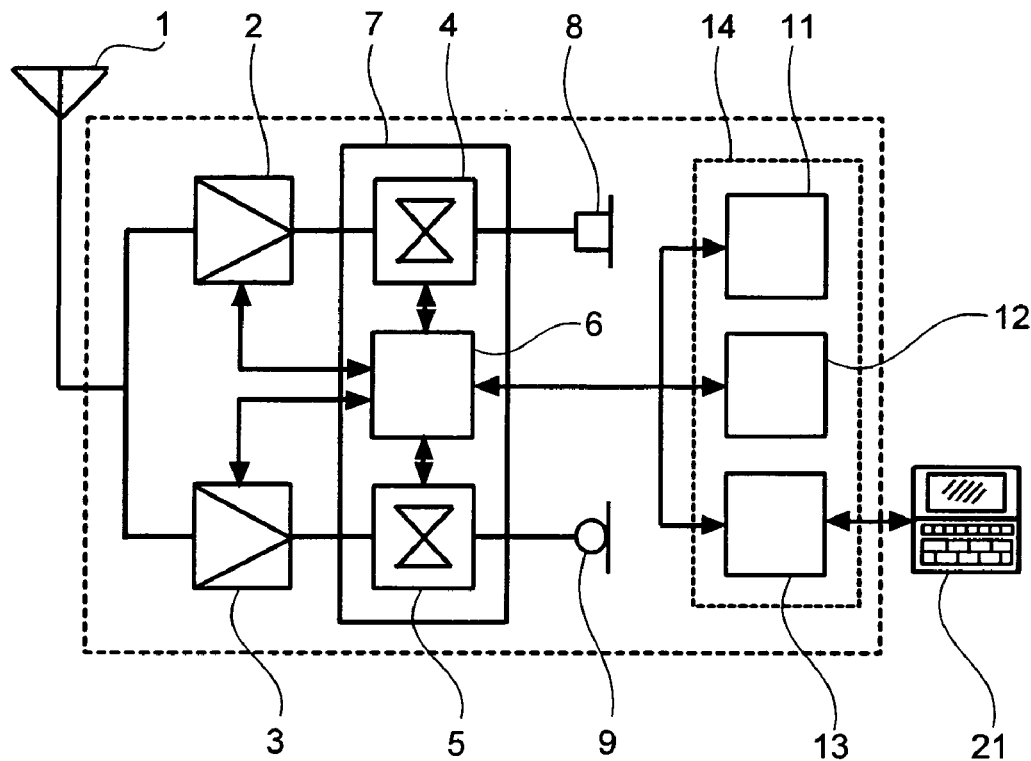
FIG. 1 is a block diagram showing the construction of a cellular phone in a first embodiment of the present invention.

A first embodiment of the present invention will now be described with reference to FIGS. 1~3 and 7. This embodiment is formed by applying the present invention to a cellular phone as a portable mobile unit. The construction of a circuit of the cellular phone in this mode of embodiment is shown in FIG. 1, and an external appearance of the cellular phone in FIG. 7.

The cellular phone in this mode of embodiment is formed so that the cellular phone receives at a receiver circuit 2 a downlink signal from a base station (not shown) with an uplink signal outputted from a transmitter circuit 3 to the base station, i.e., by-directional communication can be made between the cellular phone and the base station. A downlink signal from the base station is received at an antenna 1, and amplified and demodulated in the receiver circuit 2. An output from the receiver circuit 2 is supplied to a signal demodulator 4 in a signal processor 7. The signal processor 7 has a control processor 6 and a signal modulator 5 in addition to the signal demodulator 4. The signal demodulator 4 divides an output from the receiver 2 into a communication signal and a control signal by demodulating a CDMA signal. Namely, a received signal is converted into a digital signal in the demodulator 4 and subjected to despreading and PN code demodulation, the resultant signal being divided into an aural (data) signal as a communication signal and a control signal. The control signal is supplied to the control processor 6, which controls the operation of the cellular phone on the basis of the control signal. The audio signal is converted into an analog signal, which is outputted from a receiver 8. In the case of a data signal, it is shown on a display 11, or sent to an external apparatus 21, if any, which is connected to the cellular phone at its outside, via an outer interface 13. Concrete examples of the external apparatus 21 include an apparatus used to send and receive data, such as a personal computer, an information terminal apparatus or a telemeter system. The connection of the cellular phone to the external apparatus 21 can be attained by wireless or by a medium, such as infrared rays, not to mention by wire.

A transmitter 9 is for convert voice into an input audio signal. This input audio signal is converted into a digital signal, which is then inputted into the signal modulator 5. Data signals from an input section 12 and an interface member 14 of an external interface 13 are inputted into a signal modulator 5 via the control processor 6. In the signal modulator 5, an input audio signal or a data signal inputted thereinto is subjected to PN code modulation as CDMA signal modulation and spreading, and the resultant signal is converted into an analog signal, which is sent to the transmitter circuit 3. In the transmitter circuit 3, an output from the signal modulator 5 is amplified and modulated, and then sent out as an uplink signal from the antenna 1.

In this mode of embodiment, the cellular phone has a function of alarming the worsening of the uplink speech quality to its user in case of deterioration of the uplink speech quality, in addition to the function of alarming the deterioration of downlink speech quality. The latter is performed in accordance with the detection of a decrease in electric field intensity (RSSI) and an increase in an error rate of a received signal, which occur when a received electric wave is weak enough to cause the downlink speech quality to lower, by using a function of measuring RSSI of a received electric wave and a function of measuring an error rate of a received signal at the receiver circuit 2 as are employed in a regular digital cellular phone system.

Figure 7:
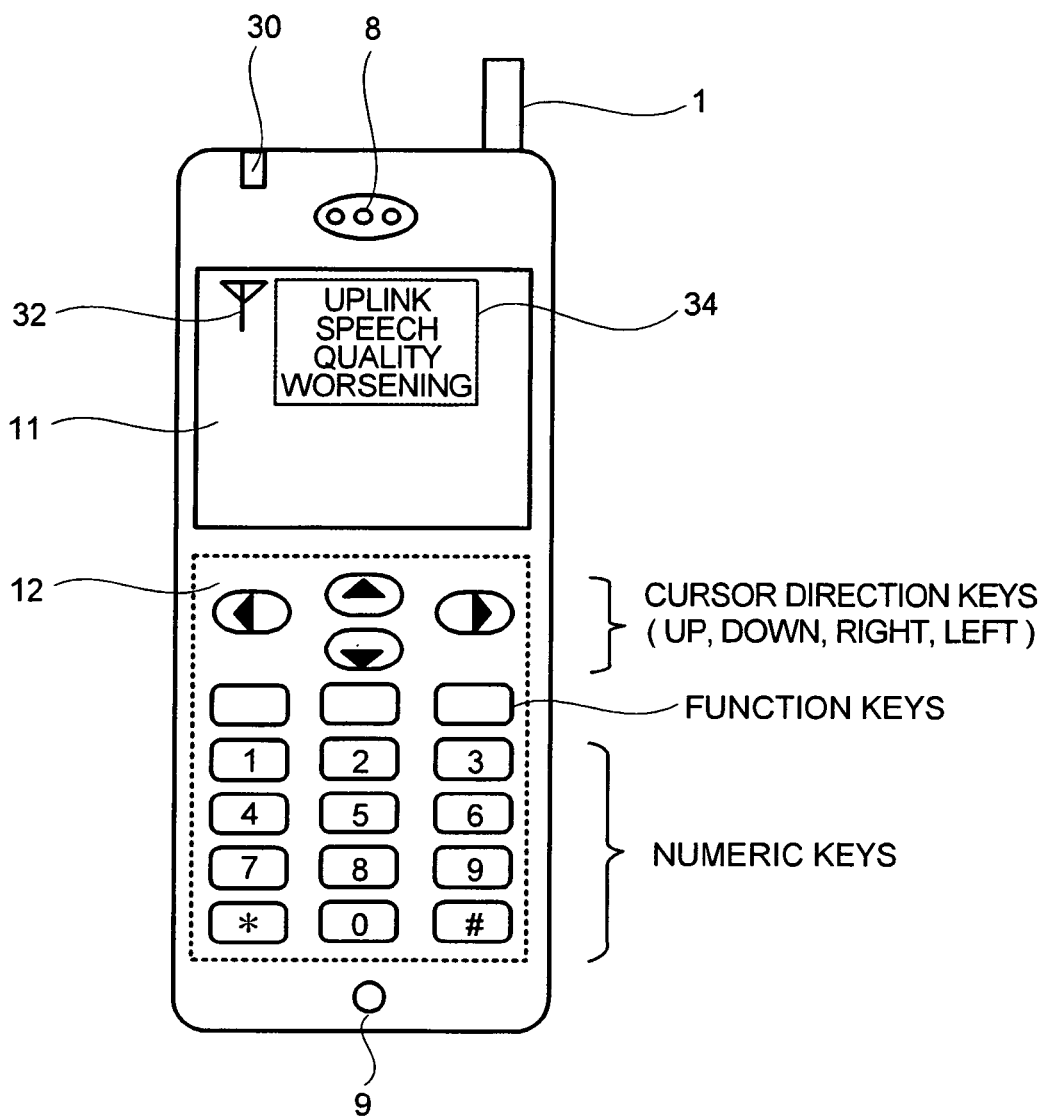
FIG. 7 is a front view showing an external appearance of the cellular phone in the first embodiment of the present invention.

The receiver circuit 2, transmitter circuit 3, signal demodulator 4, signal modulator 5, control processor 6, receiver 8, microphone 9, display 11 and input section 12 are contained or installed in a casing. As shown in FIG. 7, the antenna 1 is provided so as to project from the casing, and the receiver 8, microphone 9, display 11 and input section 12 on an outer surface of the casing. The display 11 is formed of a liquid crystal display, and the input section 12 has cursor direction keys (up, down, right, left) for moving a cursor on the display 11 and scrolling a display screen, function keys for setting or selecting various kinds of functions, and number keys for inputting telephone numbers or data.

Figure 2:
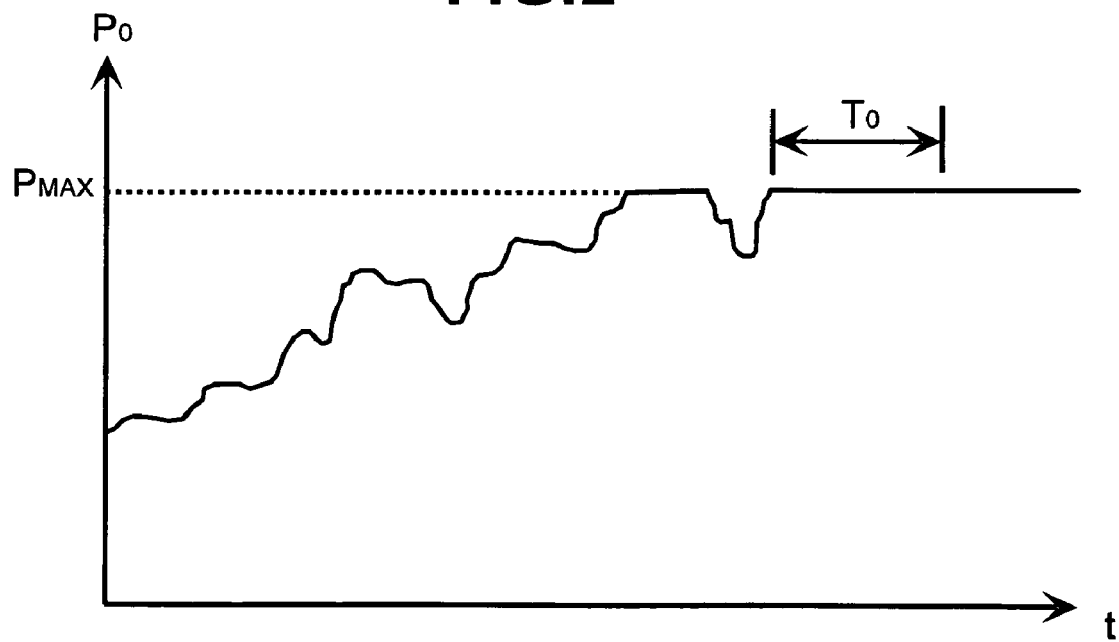
FIG. 2 is a diagram showing an example of variation of transmission power of the cellular phone in the first embodiment of the present invention.

FIG. 2 is a diagram showing an example of variation of transmission power of the cellular phone in this mode of embodiment. As shown in the drawing, the cellular phone controls its output power in accordance with a control signal sent from a base station. In a CDMA system, the transmission power of a cellular phone in service is controlled by an electric power control signal, and, in an IS-95 system, fine control operations of 800 times per second are conducted. In a normal condition, a transmission power control range is within a range controlled by cellular phone in normal condition. When the uplink speech quality is deteriorated with the intensity of a received signal within a predetermined range though the receiver circuit normally receives a downlink signal, the base station transmits an uplink signal intensity control signal as a downlink signal, and the control processor 6 controls a transmission output (Po) of the cellular phone so that the transmission output (Po) increases.

However, the transmission output (Po) of the cellular phone is limited by and saturated at its maximum transmission output level (Pmax).

When the uplink speech quality is not yet improved, the base station continues to send out a intensity control signal so as to increase the transmission output (Po) of the cellular phone, and, in accordance with a command of the intensity control signal, the transmission output (Po) of the cellular phone is put in a saturated state at a maximum transmission output level (Pmax) continuously. In such a case, the intensity of the received signal is in a normal range. Accordingly, the user of the cellular phone can hear the voice of the other party but the other party cannot hear the voice of the user. In such condition, the base station holds the line for a certain period of time but, when the uplink speech quality is not improved during this time, the base station cuts off the line.

When the base station continues to send out a intensity control signal so as to increase the transmission output (Po) from the cellular phone though the downlink signal intensity is within a predetermined normal range, there is a possibility that an uplink signal does not reach or fails to reach the base station. Therefore, when the condition in which the transmission output (Po) from the cellular phone is saturated at a maximum transmission output level (Pmax) continues to be held for a period of time not shorter than a certain period of time (To), the control processor 6 judges the condition as failure in uplink or the condition in which the transmission signal does not reach or fails to reach the other party or the object person, and sends out an uplink speech quality alarm signal before the line is cut off by the base station. This enables the user of the cellular phone to be informed that there is the possibility that the line is cut off. The alarming of the user may be done by producing sounds or by displaying words on a display screen of the display 11 as shown in FIG. 7. Moreover, both the method of producing sounds and the method of displaying words on a display screen may be used together.

When the user is alarmed of the worsening of the uplink speech quality by a sound producing method, the intervals of producing sounds are set different from those of producing sounds for alarming a user of the worsening of the downlink speech quality in the related techniques so that the user of the cellular phone in this mode of embodiment can distinguish the sounds from each other. For example, the intervals of a sound (which the user hears as "pip" sound) continuing for a predetermined period of time (for example, 0.4 seconds) at a predetermined frequency (for example, 1 kHz) are changed. In a concrete example, when the downlink speech quality lowers, longer and shorter sounds are repeatedly produced (for example, a one-second sound and a 0.2-second sound are produced alternately in repetition) so that these sounds are heard as "pip-pip, pip-pip, pip-pip, pip-pip, pip-pip . . . ". When the uplink speech quality lowers, the intervals of sounds are set to a predetermined larger levels (for example, 0.6 seconds) so that the sounds are heard as "pip, pip, pip, pip, pip . . . ". When both the downlink speech quality and uplink speech quality lower, the intervals of sounds are set to predetermined smaller levels (for example, 0.1 seconds) so that the sounds are heard as "pip-pip-pip-pip-pip-pip-pip . . . ". These sounds may be outputted from the receiver, or from a ringer or a speaker which produces an arrival signal sound. Instead of providing intervals of producing sounds, sounds of different frequencies, different tone qualities or different rhythms or different melodies may be used so that one speech quality alarm can be distinguished from another. This enables the user to recognize a deterioration of the speech quality by his/her aural sense. Also, a vibrator may be operated to appeal to tangible sense of the user.

The deterioration of the speech quality can also be appealed to the visual sense of the user. As shown in FIG. 7, during regular oral talking or data communication, a message 34 "UPLINK SPEECH QUALITY WORSENING"

may be shown on the display 11, an indication 32 of an antenna may be blinked, or a mark or an icon instead of a message may be displayed. Especially, when a color liquid crystal is used for the display 11, the color of the indication 32 of an antenna displayed may be changed from that of the normal reception condition (for example, when the reception condition is normal, the indication 32 is colored black, and, when the uplink speech quality lowers, it is colored red), or the color of the letters displayed or that of the background may be changed from that of the normal reception condition when the uplink speech quality deteriorates. An arrival signal indicating LED 30 not used in the talking condition may be flashed or blinked. When the LED 30 is capable of emitting plural colors of light, it may be lit continuously or flashed in a color different from the color used in a normal reception condition. Since this LED 30 is usually provided in a position in which the LED can be seen easily, the LED is effective as an alarm. Therefore, a visual uplink speech quality alarm can be given by using this LED 30 as necessary.

Figure 3:
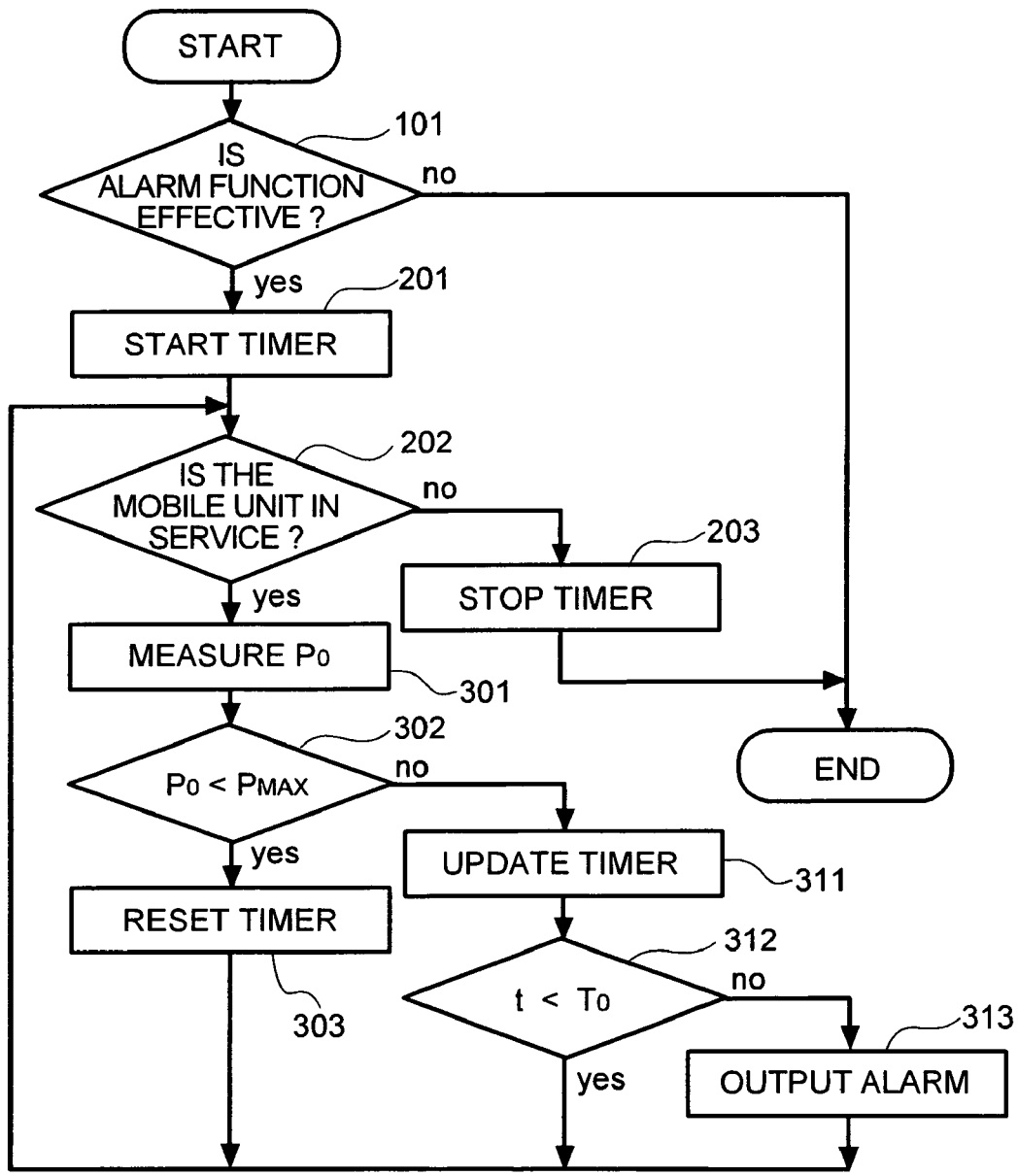
FIG. 3 is a flow chart showing the processing of an operation of an uplink speech quality alarm in the cellular phone in the first embodiment of the present invention.

When the external apparatus 21, such as a personal computer or a mobile terminal is connected to the cellular phone, an alarm signal may be sent to the external apparatus to have the external apparatus 21 give an aural or visual alarm. When this method is practiced, the user can directly know (without examining the cellular phone) a decrease in throughput occurring due to a deterioration in the line speech quality FIG. 3 is a flow chart showing the processing of an uplink speech quality alarm in the cellular phone in this embodiment, with reference to which a flow of the alarm processing operation will be described.

First, a function of giving an uplink speech quality alarm is checked as to whether the function is effective or not. Whether the function is effective or ineffective is determined by the user's operations for selecting and setting this function. When the function of giving an uplink speech quality is set "ineffective", the processing operation is immediately finished (Step 101).

When the function of giving an uplink speech quality alarm is set "effective", a timer for the uplink speech quality alarm is started (Step 201).

The cellular phone is then checked (Step 202) as to whether it is in service. When the cellular phone is not in service, the timer for the uplink speech quality alarm is stopped to finish (Step 203) the alarm processing operation.

When the cellular phone is in service, a transmission output (Po) is measured (or a set value of a transmission output level is referred to) (Step 301). The transmission output (Po) is checked (Step 302) as to whether it is greater than or equal to a maximum transmission output level (Pmax).

When an actual transmission output (Po) level is lower than the maximum transmission output level (Pmax), the timer for the uplink speech quality alarm is reset, and the processing operation is returned (Step 303) to the step of checking the condition of the cellular phone.

When the actual transmission output (Po) level is greater than or equal to the maximum transmission output (Pmax) level, the timer for the uplink speech quality alarm is updated (Step 311) by a period of time corresponding to the time elapsed, and a timer value (t) for the actual uplink speech quality alarm is checked as to whether it is smaller than a set value (To) or not. When the timer value (t) for the uplink speech quality alarm is smaller than the set value (To), the processing operation is returned (Step 312) to the step of checking the condition of the cellular phone.

When the actual timer value (t) for the uplink speech quality alarm is not smaller than the set value (To), an uplink speech quality alarm signal is sent out for a specified period of time, and the processing operation is returned (Step 313) to the step of checking the condition of the cellular phone.

Therefore, when the actual transmission output (Po) level is greater than or equal to the maximum transmission output (Pmax) level for a period of time not shorter than the time represented by the set level (To) of the timer for the uplink speech quality alarm, the uplink speech quality alarm signal is sent out continuously.

The above-described processing operation shown in the flow chart of FIG. 3 is executed by the control processor 6, and an uplink speech quality alarm signal is sent out from the control processor 6 to the receiver 8 via the signal demodulator 4.

In this embodiment, an alarm is given when the condition in which the actual transmission output (Po) level is greater than or equal to the maximum transmission output (Pmax) level continues for a period of time not shorter than the time represented by the timer set level (To) but the present invention is not limited to this embodiment. The cellular phone may be formed so that an alarm is given when the length of the time of the condition in which the level of a transmission output level (Po) of the cellular phone is greater than or equal to that of a maximum transmission output level (Pmax) continues is greater than or equal to a predetermined time ratio. Namely, a ratio of a period of time during which a transmission output level (Po) of the cellular phone is saturated at a maximum transmission output level (Pmax) to a total predetermined period of time including the mentioned period of time is determined. When this ratio exceeds a predetermined level, the uplink speech quality is regarded as low, and an uplink speech quality alarm may then be given. This procedure is effective for giving an alarm when the condition where the transmission output level (Po) is greater than or equal to the maximum transmission output level (Pmax) occurs frequently, though the length of the time of each occurrence is lower than the timer set level (To).

Figure 4:
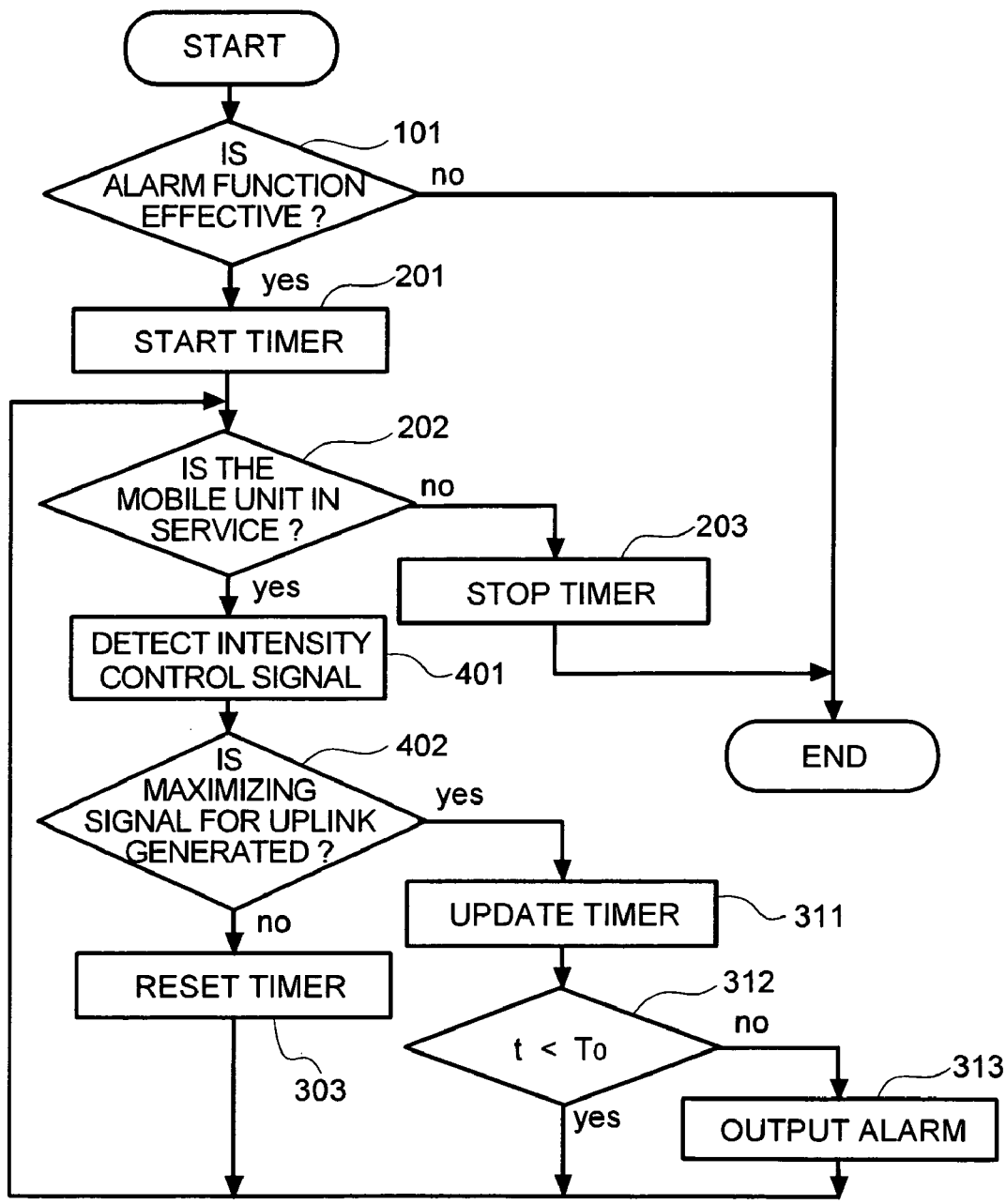
FIG. 4 is a flow chart showing the processing of an operation of an uplink speech quality alarm in a cellular phone in a second embodiment of the present invention.

A second embodiment of the present invention will be described with reference to FIG. 4. The software of this embodiment is different from that of the first embodiment but the construction of the hardware in this embodiment is basically same as that of the first embodiment. In the second embodiment, the control processor 6 judges whether a signal having an intensity that brings the uplink signal into maximum level is generated continuously for a period of time longer than or equal to a predetermined period of time while the downlink signal is received normally at a receiver circuit 2. When the length of the time of the signal having the intensity capable of maximizing the uplink signal exceeds a predetermined level, the uplink speech quality is regarded as low or deteriorated, and an uplink speech quality alarm signal is generated.

In this embodiment, the flow of a processing operation is the same as that of the processing operation shown in FIG. 3 except that the operations of steps 301 and 302 are substituted by the operations of steps 401 and 402. Namely, a function of giving an uplink speech quality alarm is checked first as to whether the function is effective or not. When the function of giving the uplink speech quality alarm is set "ineffective", the processing operation is immediately finished (Step 101).

When the function of giving the uplink speech quality alarm is set "effective", a timer for the uplink speech quality alarm is started (Step 201).

A cellular phone is then checked (Step 202) as to whether it is in service. When the cellular phone is not in service, the timer for the uplink speech quality alarm is stopped and the cellular phone finishes (Step 203) the processing operation.

When the cellular phone is in service, a intensity control signal is read (Step 401), and a command of this signal is checked (Step 402) as to whether the command is a maximum value command.

When the command is a maximum value command, the timer for the uplink speech quality alarm is reset, and the processing operation is returned (Step 303) to the cellular phone condition checking step.

When the command is not a maximum value command, the timer for the uplink speech quality alarm is updated (Step 311) by a period of time corresponding to a time elapsed, and an actual timer value (t) of the uplink speech quality alarm is checked as to whether the value (t) is smaller than a set value (To). When the timer value (t) is smaller than the set value (To), the processing operation is returned (Step 312) to the cellular phone condition checking step.

When the actual timer value (t) for the uplink speech quality alarm is not smaller than the set value (To), an uplink speech quality alarm signal is sent out for a specified period of time, and the processing operation is returned (Step 313) to the cellular phone condition checking step.

Therefore, when the command of the intensity control signal is a maximum value command for a period of time longer than or equal to the time represented by the set value (To), an uplink speech quality alarm signal is sent out continuously.

Figure 5:
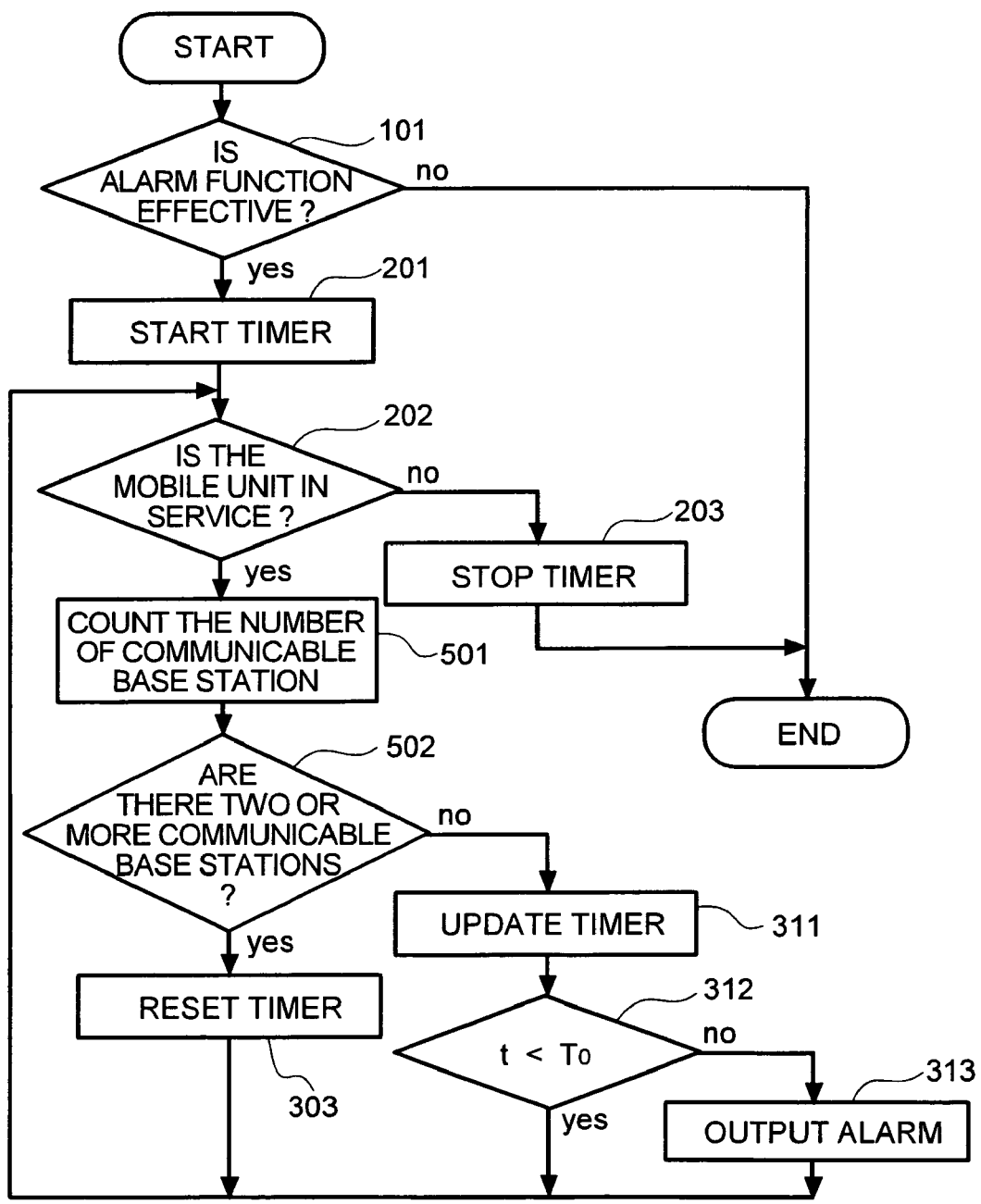
FIG. 5 is a flow chart showing the processing of an operation of an uplink speech quality alarm in a cellular phone in a third embodiment of the present invention.

A third embodiment of the present invention will be described with reference to FIG. 5. The software of this embodiment is different from that of the first embodiment but the construction of the hardware on this embodiment is basically the same as that of the first embodiment. In the third embodiment, the number of base stations with which a control processor 6 can communicate is determined, and, when this number is one, an alarm is generated. When there is only one base station with which the control processor 6 can communicate, an uplink signal does not reach the base station in some cases due to topographical conditions, though a downlink signal reaches the control processor. Therefore, in such a case, a judgement is given that there is a fear of deterioration in the uplink speech quality, and an uplink speech quality alarm signal is generated.

In this *embodiment, the flow of the processing operation is identical with that of the processing operation shown in FIG. 3 except the operations of Steps 401 and 402. Namely, a function of giving an uplink speech quality alarm is checked first as to whether the function is effective or not. When the function of giving the uplink speech quality alarm is set "ineffective", the processing operation is immediately finished (Step 101).

When the function of giving the uplink speech quality alarm is set "effective", a timer for the uplink speech quality alarm is started (Step 201).

A cellular phone is then checked (Step 202) as to whether it is in service. When the cellular phone is not in service, the timer for the uplink speech quality alarm is stopped to finish (Step 203) the processing operation.

When the cellular phone is in service, the number of the base stations is counted (Step 501), and the counted number of the base stations is checked (Step 502) as to whether the number is not smaller than two.

When the number of the base stations is not smaller than two, the timer for the uplink speech quality alarm is reset, and the processing operation is returned (Step 303) to the cellular phone condition checking step.

When the number of the base stations is one, the timer for the uplink speech quality alarm is updated (Step 311) by a period of time corresponding to the length of the time elapsed, and an actual value (t) of the timer for the uplink speech quality alarm is checked as to whether the value (t) is smaller than a set value (To) or not. When the timer value (t) is smaller than the set value (To), the processing operation is returned (Step 312) to the cellular phone condition checking step.

When the actual value (t) of the timer for the uplink speech quality alarm is not smaller than the set value (To), an uplink speech quality alarm signal is sent out for a specified period of time, and the processing operation is returned (Step 313) to the cellular phone condition checking step.

Therefore, when the number of the base stations is one for a period of time longer than or equal to the time represented by the set value (To) of the timer for the uplink speech quality alarm, an uplink speech quality alarm signal is sent out continuously.

Figure 6:
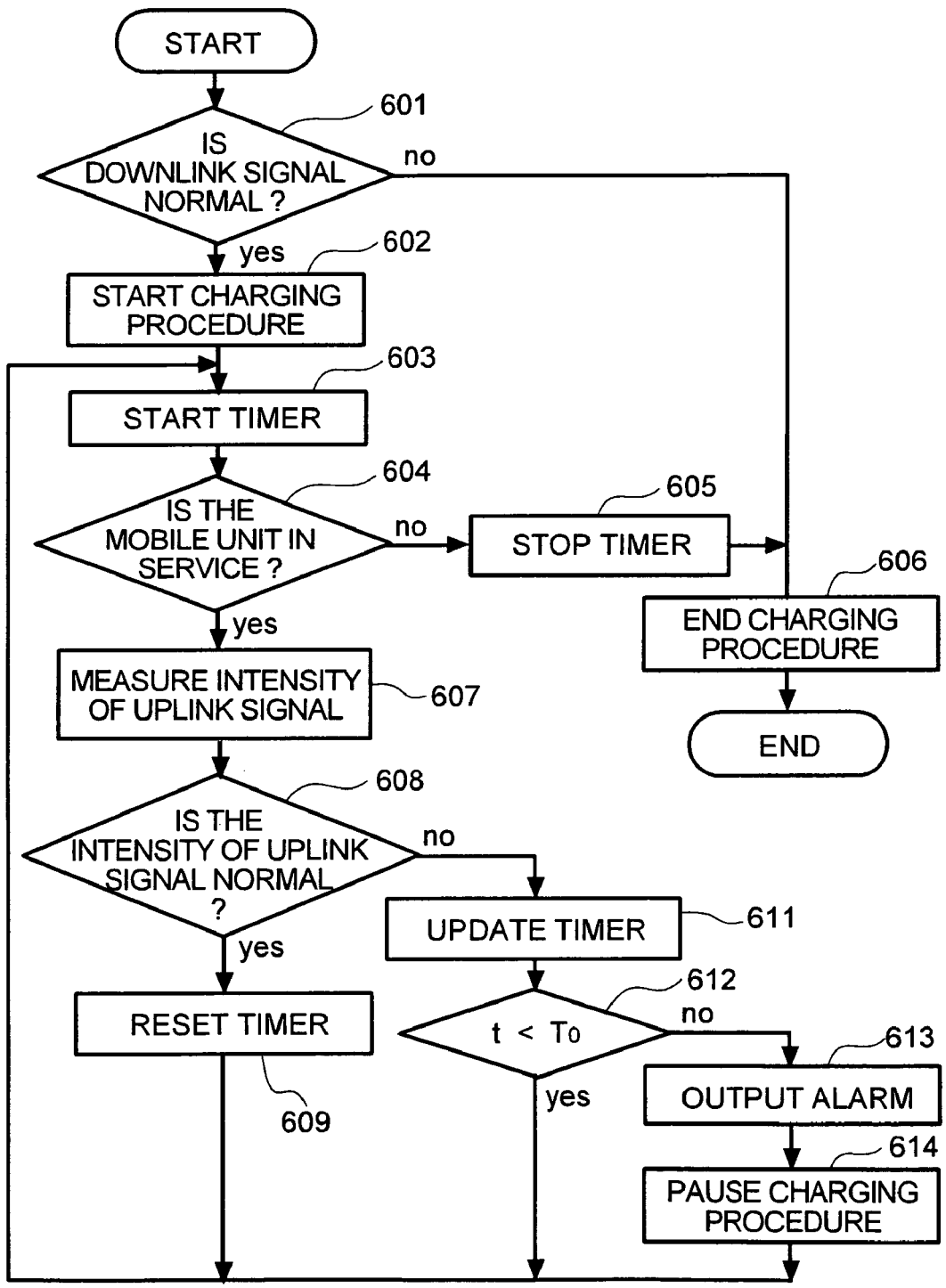
FIG. 6 is a flow chart showing the processing of an operation of an uplink speech quality alarm in a communication system in a fourth embodiment of the present invention.

A fourth embodiment of the present invention will be described with reference to FIG. 6. This mode of embodiment relates to a communication system including a base station, and a portable mobile unit which is capable of making bi-directional wireless communication with the base station, and which is provided with a controller for control a transmission intensity of a signal on the basis of a intensity control signal contained in a downlink signal sent from the base station. When the condition in which a intensity of a reception uplink signal is lower than a predetermined level continues for a period of time longer than or equal to a predetermined period of time even though the base station sends out a intensity control signal containing a command to set a transmission intensity of the uplink signal to a maximum transmission output level, the base station judges that the uplink signal does not reach the base station. At this time, the base station transmits an alarm signal representative of the deterioration of the line speech quality to a portable mobile unit, which receives this signal and carries out at least either the displaying of the abnormality or the giving of an alarm for the abnormality. A typical example of the portable mobile unit is a cellular phone.

Such a system is made up of a base station in the possession of an telecommunication company (carrier), and a portable mobile unit belonging to a user or a subscriber who made a contract with the carrier, and a process for putting on the user the charge for a telephone call made by utilizing the wireless communication system is carried out. However, the condition in which an uplink signal does not reach or fails to reach the base station though a downlink signal normally reaches the mobile unit indicates that a telephone conversation is not established. In this embodiment, an alarm signal is sent in such a case from the base station to the portable mobile unit to stop the charging process. This enables the carrier to give improved services to the user, and the carrier's competitive power with respect to that of other companies of the same trade to be improved.

A flow of the processing operation will now be described with reference to FIG. 6.

The base station first checks (Step 601) a downlink signal, which is transmitted to the portable mobile unit, as to whether the signal is normal or not. When this signal is not normal, the processing operation is immediately finished via a charging procedure finishing step (Step 606).

When the downlink signal is normal, the charging procedure for the portable mobile unit is started (Step 602).

The timer for the uplink speech quality alarm is then started (Step 603), and the cellular phone is checked (Step 604) as to whether the phone is in service. When the cellular phone is not in service, the timer for the uplink speech quality alarm is stopped (Step 605), and the charging procedure is finished (Step 606) to end the processing operation.

When the cellular phone is in service, the uplink signal sent out from the portable mobile unit is measured (Step 607). The intensity of the uplink signal is checked (Step 608) as to whether the intensity is normal or not.

When the uplink signal is normal, the timer for the uplink speech quality alarm is reset, and the processing operation is returned (Step 609) to the cellular phone condition checking step.

When the intensity of the uplink signal is not normal, the timer for the uplink speech quality alarm is updated (Step 611) by a period of time corresponding to the length of the time elapsed, and the value (t) of the timer for the uplink speech quality alarm is checked as to whether the value is smaller than the set value (To). When the value (t) of the timer for the uplink speech quality alarm is smaller than the set value (To), the processing operation is returned (Step 612) to the cellular phone condition checking step.

When the value (t) of the timer for the uplink speech quality alarm is not smaller than the set value (To), the uplink speech quality alarm signal is sent out (Step 613) to the portable mobile unit for a specified period of time, and the charging procedure is temporarily stopped (Step 614). The processing operation is returned to the step (Step 603) of starting the timer for the uplink speech quality alarm.

Therefore, when the intensity of the uplink signal is not normal for a period of time not shorter than the length of the time corresponding to the set value (To) of the timer for the uplink speech quality alarm, the uplink speech quality alarm signal is sent out continuously.

According to the above-described modes of embodiment, the user perceiving an uplink speech quality alarm can judge that a transmission signal from the cellular phone in use does not reach the base station, and avoid the cutoff of the telephone communication by trying to improve the speech quality by extending the antenna or changing the talking position.

What is claimed is:

1. A portable mobile unit comprising:
    a receiver circuit for receiving a downlink signal from a base station,
    a signal demodulator for dividing an output from said receiver circuit into a communication signal and a control signal,
    a control processor operative for receiving said control signal, and
    a transmitter circuit for amplifying and modulating an output signal to be transmitted as an uplink signal from an antenna,
    wherein:
    said control signal contains an intensity control signal to control the intensity of said uplink signal, and
    said control processor generates an alarm associated with the uplink signal in response to receipt of an intensity control signal included in the control signal for maximizing the intensity of said uplink signal while said downlink signal is normally received.

2. A portable mobile unit according to claim 1, wherein said control processor generates an alarm when the number of base stations said portable mobile unit can communicate with properly is one.

3. The portable mobile unit of claim 1, wherein the control processor is configured to generate the alarm in response to the intensity control signal for maximizing the intensity of the uplink signal lasting for a predetermined period of time.

4. A portable mobile unit according to claim 1, further comprising:
    a receiver for outputting voice on the basis of an audio output signal included in said communication signal,
    a microphone for converting voice into an input audio signal, and
    a signal modulator for performing code modulation of said input audio signal,
    wherein said downlink signal contains an intensity control signal for controlling intensity of said uplink signal, said control processor generates an alarm when a signal for maximizing intensity of said uplink signal included within said intensity control signal lasts for predetermined period of time or more, while said downlink signal is normally received at said receiver circuit; and
    said control processor is supplied with said control signal from said signal demodulator; and said transmitter circuit amplifies and modulates an output from said signal modulator and sends out a resultant signal as an uplink from said antenna.

5. A portable mobile unit according to claim 1, further comprising:
    a receiver for outputting voice on the basis of an audio output signal included in said communication signal,
    a microphone for converting voice into an input audio signal, and
    a signal modulator for performing code modulation of said input audio signal,
    wherein said control processor generates an alarm when the number of communicable base stations is one; and
    said control processor is supplied with said control signal from said signal demodulator; and said transmitter circuit amplifies and modulates an output from said signal modulator and sends out a resultant signal as an uplink from said antenna.

* * * * *